United States Patent [19]

Waerve

[11] 4,352,197
[45] * Sep. 28, 1982

[54] MOUNTING DEVICE FOR AN X-RAY FILM CASSETTE

[75] Inventor: Hans Waerve, Sollentuna, Sweden

[73] Assignee: Siemens Aktiengesellschaft, Berlin and Munich, Fed. Rep. of Germany

[*] Notice: The portion of the term of this patent subsequent to Jan. 27, 1998, has been disclaimed.

[21] Appl. No.: 183,944

[22] Filed: Sep. 4, 1980

Related U.S. Application Data

[62] Division of Ser. No. 16,293, Feb. 28, 1979, Pat. No. 4,247,778.

[30] Foreign Application Priority Data

Mar. 17, 1978 [DE] Fed. Rep. of Germany ....... 2811765

[51] Int. Cl.³ ............................................. G03B 41/16
[52] U.S. Cl. .................................... 378/177; 378/181
[58] Field of Search .................. 250/439 R, 451, 456, 250/468

[56] References Cited

U.S. PATENT DOCUMENTS 3,293,430 12/1966 Wustner .............................. 250/451

Primary Examiner—Craig E. Church
Attorney, Agent, or Firm—Hill, Van Santen, Steadman, Chiara & Simpson

[57] ABSTRACT

In an exemplary embodiment, a chamber member in which an X-ray film cassette can be inserted can be disposed in a mounting device located under a patient. The cassette chamber member is arranged in the mounting device in such manner that it can be brought out from under the patient and disposed laterally of the patient for facilitating corresponding X-ray views without disturbing the patient.

3 Claims, 4 Drawing Figures

MOUNTING DEVICE FOR AN X-RAY FILM CASSETTE

CROSS REFERENCE TO RELATED APPLICATION

The present application is a divisional application based on my copending application Ser. No. 016,293 filed Feb. 28, 1979, now U.S. Pat. No. 4,247,778 issued Jan. 27, 1981.

BACKGROUND OF THE INVENTION

The invention relates to a mounting device with a chamber into which an X-ray film cassette can be inserted and which can be arranged under a patient.

A mounting device of this type is described in the U.S. Pat. No. 4,060,733. With such a holding device, when, after a frontal X-ray photograph, a lateral photograph is also to be made with the path of the rays displaced by 90°, the patient must be carefully lifted up and the mounting device with the X-ray film cassette pulled away under the patient. The mounting device can then be placed at the side of the patient and braced with, for example, a pillow. The transition to a different radiation direction is very annoying for the patient and inconvenient for the operating personnel. Further, because of the not exactly fixed position of the holding device in a lateral photograph, an optimum X-ray picture is not always produced.

SUMMARY OF THE INVENTION

The object of the invention is to create a mounting device of the type initially cited which makes it possible to make frontal and lateral X-ray photographs, whereby the mounting device is fixed with reference to the patient in each cassette position.

This object is inventively achieved in that the cassette chamber is seated in the mounting device in such manner that it can be brought into two defined positions which are displaced by about 90° in respect to one another. In the inventive mounting device, the cassette can be rotated by 90°, whereby the cassette chamber and thus the cassette is fixed with reference to the mounting device and the patient lying thereon.

In an advantageous embodiment of the invention, it is proposed that the cassette chamber lies in a housing in its final position and is provided with a handhold by means of which it can be pulled out of the housing and rotated into the other final position. Thereby it is achieved that one can make frontal as well as lateral X-ray photographs without having to pull the mounting device away under the patient.

Further details of the invention derive from the subclaims.

In the following, the invention is explained in greater detail on the basis of a sample embodiment illustrated in the accompanying sheets of drawings: and other objects, features and advantages will be apparent from this detailed disclosure and from the appended claims.

DETAILED DESCRIPTION

Figure 1:
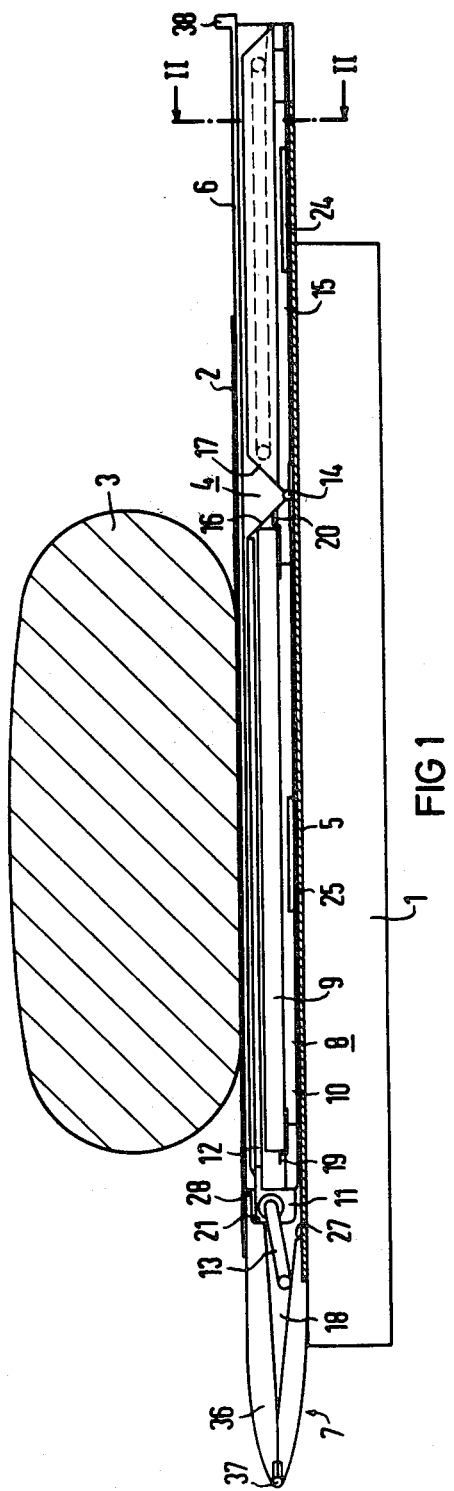
FIG. 1 is a longitudinal section through an inventive mounting device.

FIG. 1 shows a patient positioning table 1 with a sheet 2, on which a patient to be examined is arranged as indicated at 3. A mounting device 4 for an X-ray film cassette is arranged between the patient 3 (or the sheet 2) and the table 1.

Figure 2:
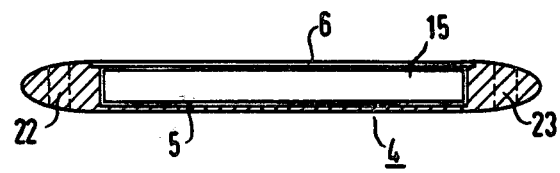
FIG. 2 is a cross section through the mounting device according to FIG. 1 and taken along the line II—II.

The mounting device 4 exhibits a housing with a lower part 5 of, for example, plastic, and an upper part 6 of a material that is permeable to X-ray beams, for instance carbon fiber (FIG. 2). The one end 7 of the mounting device 4, which is the introduction end for introducing the mounting device between the patient 3 and the table 1, is designed elliptically. The mounting device 4 exhibits a cassette chamber 8 into which an X-ray film cassette 9 can be inserted and which is movably seated in the mounting device 4. The cassette chamber 8 consists of a lower part 10, side parts of which only one side part 11 is visible in FIG. 1, and a wall 12 which is formed by a secondary radiation screen. A detector 25 of an X-ray exposure automat (automatic exposure control) present in an X-ray device that is not illustrated is arranged in the lower part 10 of the cassette chamber 8. A handle 13 is linked at the one end of the side part 11 of the cassette chamber 8. The end of the cassette chamber 8 facing away from the handle 13 is connected via a joint 14 with a carriage 15 that is movable in the housing 5, 6. The cassette chamber 8 and the carriage 15 are provided with diagonal surfaces 16, 17 on their sides which face one another.

An arrangement 24 for determining the angularity of the mounting device 4 or of the X-ray film cassette, respectively, is arranged in the carriage 15. A lid 36 which covers the one end of the housing 5, 6 is linked to the end 7 of the mounting device 4 by means of a hinge 37. The side of the lid 36 facing the cassette chamber 8 also serves as a stop 21 for the cassette chamber. Within the end 7 of the mounting device 4 comprising the lid 36, a space 18 is left free for the handle 13 for the cassette chamber 8 lying outside of the housing 5, 6. For fixing the X-ray film cassette 9 in the cassette chamber 8, leaf springs 19, 20 which are fastened in the lower part 10 of the cassette chamber 8 are provided. In FIG. 2 it is shown that the lower part 5 of the housing is provided with handholds 22, 23 for carrying the mounting device 4.

Figure 3:
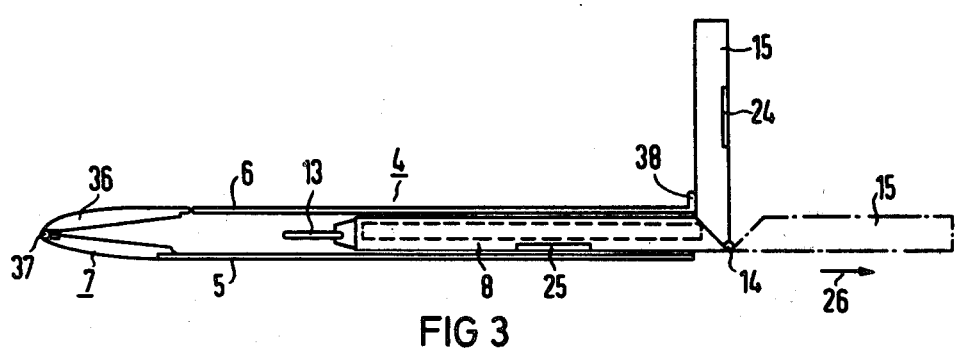
FIGS. 3 and 4 show a schematic representation of the X-ray film cassette chamber of an inventive mounting device in various positions.

Upon inserting the mounting device 4 between the sheet 2 and the table 1, only the sheet 2 need be secured. Because of the ellipsoid shape of the end 7 and the smoothly polished surface of the mounting device 4, it can be easily inserted without the patient 3 first having to be lifted up. A rigid 38 arranged at the end opposite the end 7 to be introduced, serves the operator for inserting the mounting device 4 under the patient. When a frontal X-ray photograph is to be made, the carriage 15 is pushed out of the housing 5, 6 in the direction of the arrow 26, FIG. 3, and is brought into the position indicated in FIG. 3 with the dot-dash line. In this position of the carriage 15, the end of the cassette chamber 8 facing the carriage 15 has also been pushed somewhat out of the housing 5, 6, so that one can insert an X-ray film cassette 9 into the cassette chamber 8 from the side of the cassette chamber 8 facing the carriage 15 until the introduction end of the X-ray film cassette 9 reaches the leaf spring 19 (FIG. 1) which serves as a stop. In order to determine the angularity of the mounting device 4, the carriage 15 is now rotated up by 90° around the joint 14, so that the diagonal surfaces 16, 17 of the cassette chamber 8 and of the carriage 15, respectively, lie against one another. The angularity is read at the arrangement 24, which, for example, can be a level with an angle scale. The X-ray tube of an X-ray device that is not illustrated can now be adjusted to correspond with the angularity of the mounting device 4 that has been read. Subsequently, the carriage 15 is again placed in the position indicated in FIG. 3 with the dot-dash line and is pushed into the housing 5, 6 until the end of the cassette chamber facing away from the carriage 15 has reached the stop 21 of the lid 36 (FIG. 1). A frontal X-ray photograph can now be made.

Figure 4:
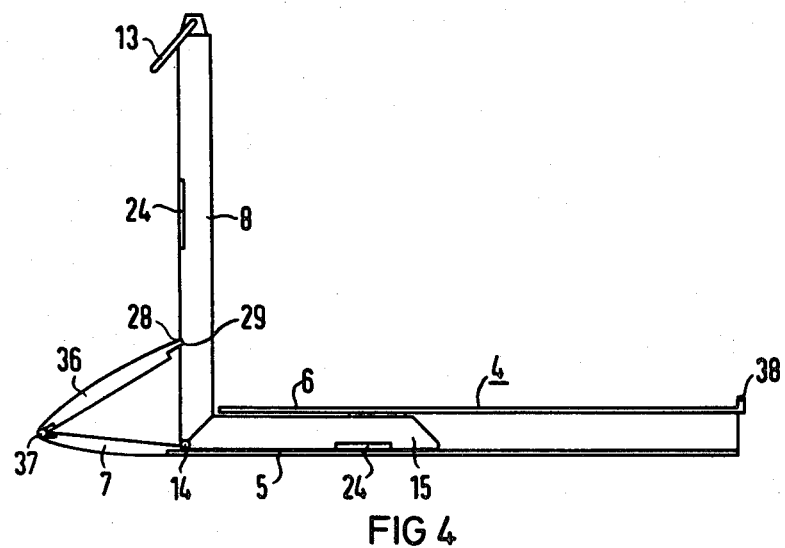

When a lateral X-ray photograph is to be made, the lid 36 is rotated around the hinge 37 by 180° with regard to the position illustrated in FIG. 1. Then, the cassette chamber 8 can be pulled out of the housing 5, 6 by means of the handle 13. A stop 27 is provided on the housing 5, 6, which stop which allows the cassette chamber 8 to be pulled out of the housing 5, 6 until the joint 14 between the cassette chamber 8 and the carriage 15 lies at the end of the housing 5, 6. The cassette chamber 8 can now be rotated by 90° around the joint 14 until the diagonal surfaces 16, 17 of the cassette chamber 8 and of the carriage 15, respectively, lie against one another as is shown in FIG. 4. The lid 36 is subsequently swung back until its free end 28 catches in a groove 29 arranged in the cassette chamber 8, in order to thus brace the cassette chamber 8 which has been rotated up. In this position of the cassette chamber 8, the X-ray film cassette 9 for the frontal exposure can be pulled out and exchanged for a further X-ray film cassette for a lateral photograph (FIG. 4).

The mounting device 4 is wider than a usual patient positioning table 1. Therefore, it is simple to undertake adjustments of the mounting device 4 or of the X-ray film cassette 9, respectively, with reference to the patient. Further, the position of the film cassette 9 in the mounting device 4 is precisely fixed in a frontal as well as in a lateral photograph, so that when the mounting device 4 has been adjusted preceding a frontal photograph it is not necessary to adjust the mounting device 4 again in a subsequent lateral photograph.

Because of the fact that a wall 12 of the cassette chamber 8 forms the secondary radiation screen in frontal and lateral photographs, X-ray film cassettes without a built-in secondary radiation screen can be used, which are cheaper than X-ray film cassettes with built-in secondary radiation screens.

It will be apparent that many modifications and variations may be effected without departing from the scope of the novel concepts and teachings of the present invention.

I claim as my invention:

1. A cassette mounting assembly comprising a cassette mounting device (4) of configuration to be disposed in underlying relation to a patient, said cassette mounting device having a cassette chamber (8) into which an X-ray film cassette can be inserted; and said cassette chamber (8) being movable in said cassette mounting device (4) from a first position in underlying relation to a patient, to a second position displaced by about 90° with respect to said first position and disposed laterally of a patient while the cassette mounting device (4) remains in said underlying relation to the patient, said cassette mounting device (4) having an upper wall (6) of a material that is permeable to X-ray beams for underlying a patient to be examined and for overlying said cassette chamber (8) in said first position thereof, said cassette mounting device (4) consisting of components all of which lie essentially below the level of said upper wall (6) in said first position of said cassette chamber, and means comprising the disposition of said components essentially below the level of said upper wall (6) providing an unobstructed space above the level of said upper wall (6) over the entire extent of the cassette mounting device (4) when said cassette chamber is in said first position, said cassette mounting device having a laterally extending receiving space below said upper wall (6) accommodating said cassette chamber (8) in said first position thereof, and providing for movement of the cassette chamber in a lateral direction, and having a lateral opening at one lateral side thereof leading from said receiving space and of a size to accomodate removal of the cassette chamber (8) from said first position and out of said receiving space, and hinge means for coupling said cassette chamber with said cassette mounting device at said one lateral side thereof such that when the cassette chamber has been moved out of said receiving space through said lateral opening said hinge means couples said cassette chamber with said cassette mounting device for pivotal movement through about 90° and into said second position with said cassette chamber extending upwardly from said lateral opening at one lateral side of a patient overlying said upper wall of said cassette mounting device, and said cassette mounting device having means comprising said hinge means for fixing said cassette chamber in said second position for the taking of a lateral X-ray photograph.

2. A mounting assembly according to claim 1, characterized in that an end (7) of the mounting device (4) is designed in an elliptical shape and the surface of the mounting device is polished smooth to facilitate insertion of the mounting device under a patient.

3. A mounting assembly according to claim 1, with an end opposite an insertion end (7) of the mounting device (4) having a ridge (38).

* * * * *